(No Model.)
S. A. STAHLEY.
COUPLING.
No. 531,071. Patented Dec. 18, 1894.
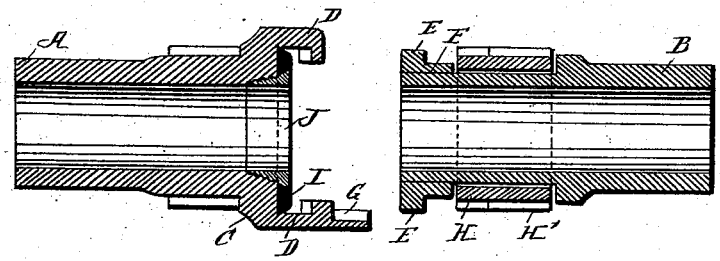
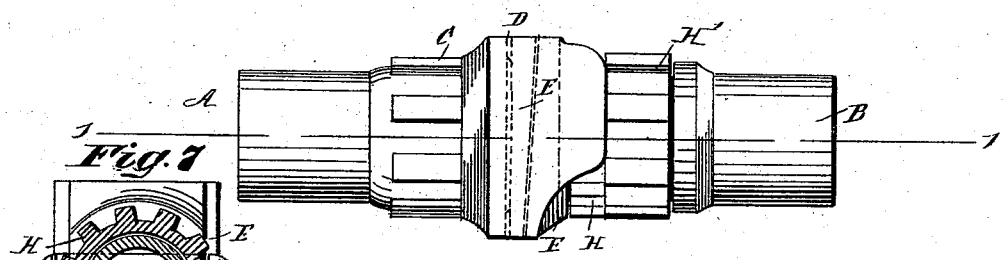
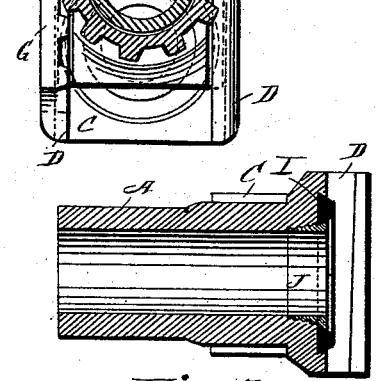
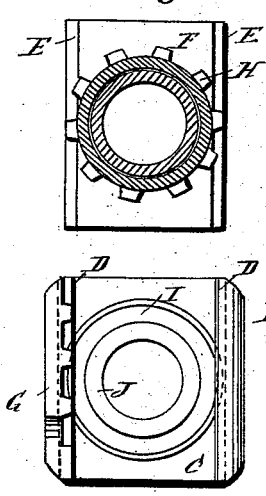
WITNESSES:
INVENTOR
S. A. Stahley
BY
Munn & Co
ATTORNEYS.

UNITED STATES PATENT OFFICE.

SIMON A. STAHLEY, OF SUSPENSION BRIDGE, NEW YORK.

COUPLING.

SPECIFICATION forming part of Letters Patent No. 531,071, dated December 18, 1894.

Application filed September 7, 1894. Serial No. 522,322. (No model.)

*To all whom it may concern:*

Be it known that I, SIMON A. STAHLEY, of Suspension Bridge, in the county of Niagara and State of New York, have invented a new and Improved Coupling, of which the following is a full, clear, and exact description.

The invention relates to pipe and hose couplings, and its object is to provide a new and improved coupling, which is comparatively simple and durable in construction, and arranged to enable the operator to positively produce a non-leaking joint, and to permit of readily connecting or disconnecting the coupling members on their full pressure and without the use of separate tools.

The invention consists principally of a coupling head provided with a rack adapted to be engaged by a gear wheel mounted to turn loosely on the other coupling head.

The invention also consists in certain parts and details, and combinations of the same, as will be hereinafter fully described and then pointed out in the claims.

Reference is to be had to the accompanying drawings, forming part of this specification, in which similar letters of reference indicate corresponding parts in all the views.

Figure 1 is a sectional plan view of the improvement, with the coupling members disconnected, the section being taken on the line 1—1 of Fig. 2. Fig. 2 is a side elevation of the improvement, with the coupling members connected. Fig. 3 is a transverse section of one of the coupling members, on the line 3—3 of Fig. 4. Fig. 4 is a side elevation of the same. Fig. 5 is a sectional plan view of the other coupling member. Fig. 6 is an end elevation of the same. Fig. 7 is a transverse section of the improvement.

The improved coupling is provided with the two members A and B, adapted to connect at their outer ends with the hose and pipes between which communication is to be established. The coupling member A is provided with a head C, formed with the oppositely-arranged guideways D, tapering from top to bottom, as plainly shown in Figs. 2 and 5, the said guideways being adapted to be engaged by the correspondingly-shaped guides E, formed on opposite sides of the head F secured on the coupling member B.

On the head C next to one of the guideways D, is formed a vertically disposed rack G, adapted to be engaged by a gear wheel H mounted to rotate loosely on the head F of the other coupling member B. This gear wheel H has a large hub formed with separate projections H' adapted to be taken hold of by the operator, or by a convenient tool for turning the gear wheel H in its bearings on the head F.

On the outer face of the head C of the coupling member A, is formed an annular groove adapted to be engaged by a gasket I, held in place by a threaded ring J, having its outer end formed with a bevel to engage a corresponding bevel on the inside of the said gasket I. The latter projects slightly beyond the face of the head C, so that when the head F is moved downward, by its guides E engaging the guideways D, then the said gasket is compressed and a firm joint is established, as the heads C and F are drawn together by the beveled guides E moving in the beveled guideways D. Now in order to conveniently move the head F downward on the head C, the operator first engages the small ends of the guides E in the guideways D, so that a tooth of the gear wheel H engages the upper teeth in the rack G, and then the operator turns the gear wheel H so as to cause the latter to roll off in a desired direction on the rack G. In doing so the gear wheel H carries the head F along, and consequently moves the guides E in the guideways D, to compress the gasket I, and to establish a firm joint between the two heads C and F.

The bores of the coupling members finally register with each other, so as to establish communication between the hose or pipe. When it is desired to uncouple the members, the operator turns the gear wheel H in the opposite direction so that the said gear wheel travels upward on the rack G, and consequently moves the head F upward out of engagement with the head C.

Having thus described my invention, I claim as new and desire to secure by Letters Patent—

1. A coupling, comprising a coupling member having a head formed with parallel transverse guideways and a rack, a second coupling member having a head formed with lateral guides adapted to engage the said guideways, and a gear wheel mounted to rotate loosely on the said second head and adapted to engage the said rack, substantially as shown and described.

2. A coupling, comprising a coupling member having a head formed with guideways tapering from top to the bottom, a rack held intermediate of the said head alongside one of the guideways, a second coupling head formed with tapering guides adapted to engage the said guideways, and a gear wheel mounted to turn loosely on the said second head and adapted to mesh with the said rack, substantially as shown and described.

3. A coupling, comprising a member provided with lateral projections having parallel transverse beveled guide-ways, one of said projections being also provided with a rack surface arranged parallel to said guide-ways, and a member having parallel beveled transverse guides adapted to engage and slide in said guide-ways, and a gear wheel mounted to turn on said second member with its teeth in engagement with the rack surface of the first-named member, said gear wheel having a roughened portion which projects beyond the lateral projections of the first-named member, substantially as set forth.

SIMON A. STAHLEY.

Witnesses:
JAMES S. HOLLENBECK,
E. J. BEHR.